(No Model.)
L. B. COBB.
AUTOMATIC CAKE TURNER.
No. 557,092. Patented Mar. 24, 1896.
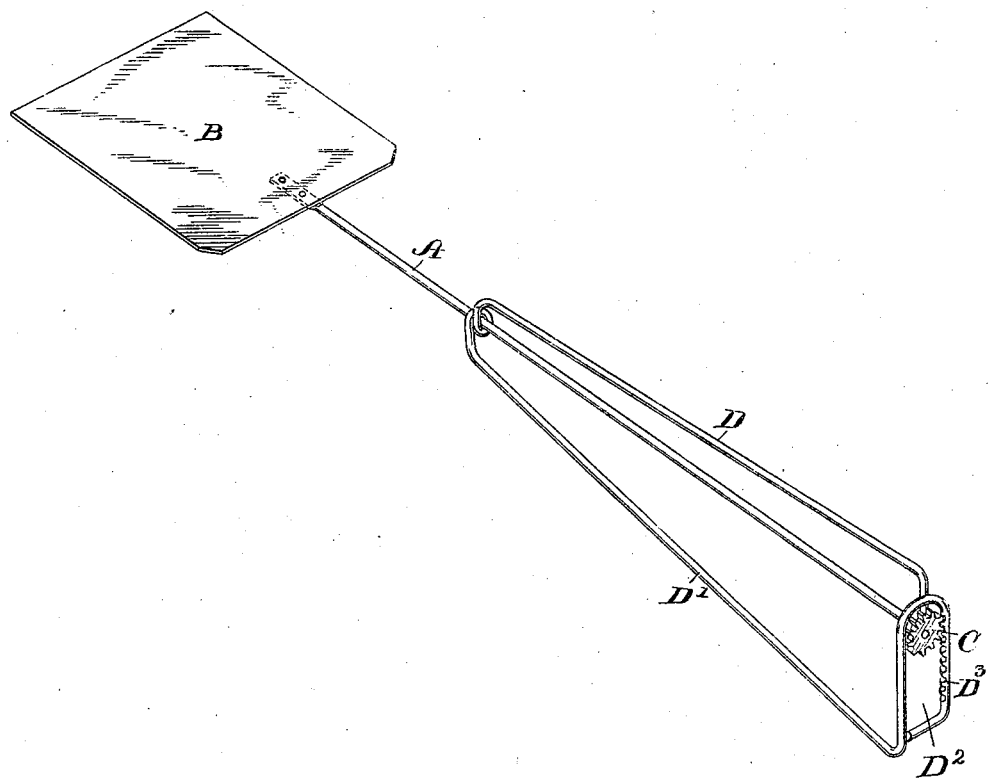
WITNESSES.
Henry Chadbourn.
George F. Chandler
INVENTOR.
Leander B. Cobb.
by D. E. Kempster,
his att'y.

UNITED STATES PATENT OFFICE.

LEANDER B. COBB, OF EVERETT, MASSACHUSETTS.

AUTOMATIC CAKE-TURNER.

SPECIFICATION forming part of Letters Patent No. 557,092, dated March 24, 1896.

Application filed November 4, 1895. Serial No. 567,799. (No model.)

*To all whom it may concern:*

Be it known that I, LEANDER B. COBB, a citizen of the United States, residing at Everett, in the county of Middlesex and State of Massachusetts, have invented certain new and useful Improvements in Automatic Cake-Turners; and I do declare the following to be a full, clear, and exact description of the invention, such as will enable others skilled in the art to which it appertains to make and use the same, reference being had to the accompanying drawing, and to the letters of reference marked thereon, which forms a part of this specification.

This invention relates to culinary utensils, particularly to implements for turning over griddle-cakes, fish, eggs, &c., during the process of cooking.

The invention has for its object to provide a device for this purpose which will automatically turn the article over from right to left, or vice versa, by simply a pressure of the hand which grasps the implement.

The invention consists in the device herein shown and described and especially pointed out in the claims.

In the drawing hereto annexed, showing a perspective view of the invention and forming a part of this specification, a wire handle or shaft A is provided, with a blade B attached thereto by suitable rivets. A toothed wheel C is fastened securely to the opposite end of said handle or shaft. A wire guard D is bent at one end to form an eye which surrounds the handle or shaft A near the toothed wheel C, extending outward for a short distance is bent substantially at right angles, and extending toward the blade B and encircling the handle or shaft A passes back on the opposite side of said shaft, forming the spring D'. The spring D' is provided on its end with a rack D³ held up into engagement with the toothed wheel C by a loop D², which substantially surrounds the said toothed wheel.

The preferred form of construction is to bend the spring D' substantially at right angles and then around the toothed wheel C and back, forming an elongated loop having teeth upon the inner surface of one side of said loop, thus constructing the guard D, spring D', loop D² and rack D³ all in one piece of wire, as shown in the drawing.

The operation of my invention is substantially as follows: The device in its normal condition is as shown in the drawing, and in this position the cake or other article to be turned over is raised from the stove or other cooking-surface, when by a slight pressure of the hand which grasps the implement, sufficient to overcome the spring D', the rack is caused to move across and revolve the gear or toothed wheel C and turn the blade B sufficient to turn the article thereon upside down. By relaxing the pressure of the hand the rack is carried back by the spring D', thus revolving the toothed wheel in the opposite direction and returning the blade to its normal position.

By my invention I am enabled to cheaply produce a culinary implement which will automatically turn the article over laterally or sidewise, which is the most natural way of operating a device for this purpose and far better than one which turns the article over to or from the operator, as will be readily appreciated by those familiar with this class of inventions.

It should be understood that this invention is susceptible of modification within the scope of mechanical skill without departing from the essential features and spirit of my invention.

Having thus described the nature, construction, and operation of my invention, I desire to secure by Letters Patent and claim—

1. In a cake-turner, the combination of a handle or shaft, a blade fast on the end of said handle or shaft, a toothed wheel fast on the handle or shaft, a toothed bar or rack engaging the toothed wheel, and a spring operating said bar or rack, for the purpose set forth.

2. A cake-turner comprising the shaft A, the blade B, the toothed wheel C, the guard D, the spring D', the loop D², and the rack D³, all substantially as and for the purpose herein described.

In testimony whereof I affix my signature in presence of two witnesses.

LEANDER B. COBB.

Witnesses:
HENRY CHADBOURN,
D. E. KEMPSTER.